United States Patent
Tsai (10) Patent No.: US 9,062,812 B2
(45) Date of Patent: Jun. 23, 2015

(54) HOLDER FOR PORTABLE ELECTRONIC DEVICE

(71) Applicant: Chi Mei Communication Systems, Inc., New Taipei (TW)

(72) Inventor: Sheng-Hsiung Tsai, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/873,425

(22) Filed: Apr. 30, 2013

(65) Prior Publication Data

US 2014/0183321 A1    Jul. 3, 2014

(30) Foreign Application Priority Data

Dec. 28, 2012  (TW) .............................. 101150884 A (51) Int. Cl.
| | |
|---|---|
| F16M 13/00 | (2006.01) |
| B60R 11/02 | (2006.01) |
| F16M 11/00 | (2006.01) |
| G10K 11/28 | (2006.01) |
| H04M 1/04 | (2006.01) |
| H04R 1/02 | (2006.01) |
| H04M 1/03 | (2006.01) |

(52) U.S. Cl.
CPC ............ *F16M 13/00* (2013.01); *B60R 11/0252* (2013.01); *F16M 11/00* (2013.01); *G10K 11/28* (2013.01); *H04M 1/04* (2013.01); *H04M 1/035* (2013.01); *H04R 1/025* (2013.01); *H04R 1/026* (2013.01); *H04R 2499/11* (2013.01)

(58) Field of Classification Search
CPC ... F16M 13/00; F16M 11/00; A47B 21/0314; A47B 23/042; B60R 11/0252; H04R 1/345; H04M 1/035; G10K 11/28

USPC ................ 248/371, 441.1, 451, 917, 346.01; D14/447, 172, 238.1; 181/175, 211; 379/446

See application file for complete search history.

(56) References Cited

U.S. PATENT DOCUMENTS

| | | | |
|---|---|---|---|
| 4,923,154 A * | 5/1990 | Konkel .......................... 248/131 |
| D323,085 S * | 1/1992 | Konkel .......................... D6/466 |
| D619,996 S * | 7/2010 | Demskie et al. ............. D14/218 |
| D640,707 S * | 6/2011 | Yeh .............................. D14/447 |
| 8,020,816 B2 * | 9/2011 | Laitila et al. ................ 248/125.7 |
| D653,668 S * | 2/2012 | Song et al. .................... D14/447 |
| D664,602 S * | 7/2012 | Chiu et al. .................... D21/333 |
| 8,240,628 B2 * | 8/2012 | Huang ......................... 248/316.1 |
| D676,855 S * | 2/2013 | Yoo et al. ..................... D14/448 |
| D681,612 S * | 5/2013 | Palacios ................... D14/238.1 |
| D682,283 S * | 5/2013 | Tak et al. ...................... D14/447 |
| D692,440 S * | 10/2013 | Tsai .............................. D14/447 |
| 8,616,327 B1 * | 12/2013 | Palacios ........................ 181/175 |
| 2003/0227746 A1 * | 12/2003 | Sato .............................. 361/686 |
| 2013/0134282 A1 * | 5/2013 | Negretti ........................ 248/450 |

\* cited by examiner

*Primary Examiner* — Anita M King
(74) *Attorney, Agent, or Firm* — Novak Druce Connolly Bove + Quigg LLP (57) ABSTRACT

A holder for supporting a portable electronic device and includes a pedestal and a supporting board. The supporting board includes a resisting portion and at least one resonator portion. The resisting portion is mounted on and has a predetermined angle with a top surface of the pedestal. The resonator portion is connected to an edge of the resisting portion and extends from the edge towards a side contrary to the resisting portion a predetermined distance and then extends towards the resisting portion. The resisting portion and the top surface of the pedestal cooperatively support the portable electronic device. The resonator portion is configured to resonate and guide sounds generated by the portable electronic device.

17 Claims, 8 Drawing Sheets

HOLDER FOR PORTABLE ELECTRONIC DEVICE

CROSS-REFERENCE TO RELATED APPLICATIONS

This application is one of the two related co-pending U.S. patent applications listed below. All listed applications have the same assignee. The disclosure of each of the listed applications is incorporated by reference into each of the other listed applications.

| U.S. Application No. | Title | Inventors |
| --- | --- | --- |
| 13/873,425 | HOLDER FOR PORTABLE ELECTRONIC DEVICE | SHENG-HSIUNG TSAI |
| 29/453,494 | HOLDER | SHENG-HSIUNG TSAI |

BACKGROUND

1. Technical Field

The present disclosure relates to holders for portable electronic devices, and particularly to a holder for improving acoustics of portable electronic devices.

2. Description of Related Art

Due to thickness and volume limits of portable electronic devices, rooms inside portable electronic devices for sound resonance are limited. The acoustics of portable electronic devices is affected accordingly. In addition, an external holder is used to support the portable electronic device, thus the portable electronic device stands with a predetermined angle instead of being held by a user. However, the holder just supports the portable electronic device convenient for users, but cannot help to improve acoustics of portable electronic device that it supports, the function of holder is unitary and acoustics of portable electronic device still needs to improve.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one".

Figure 1:
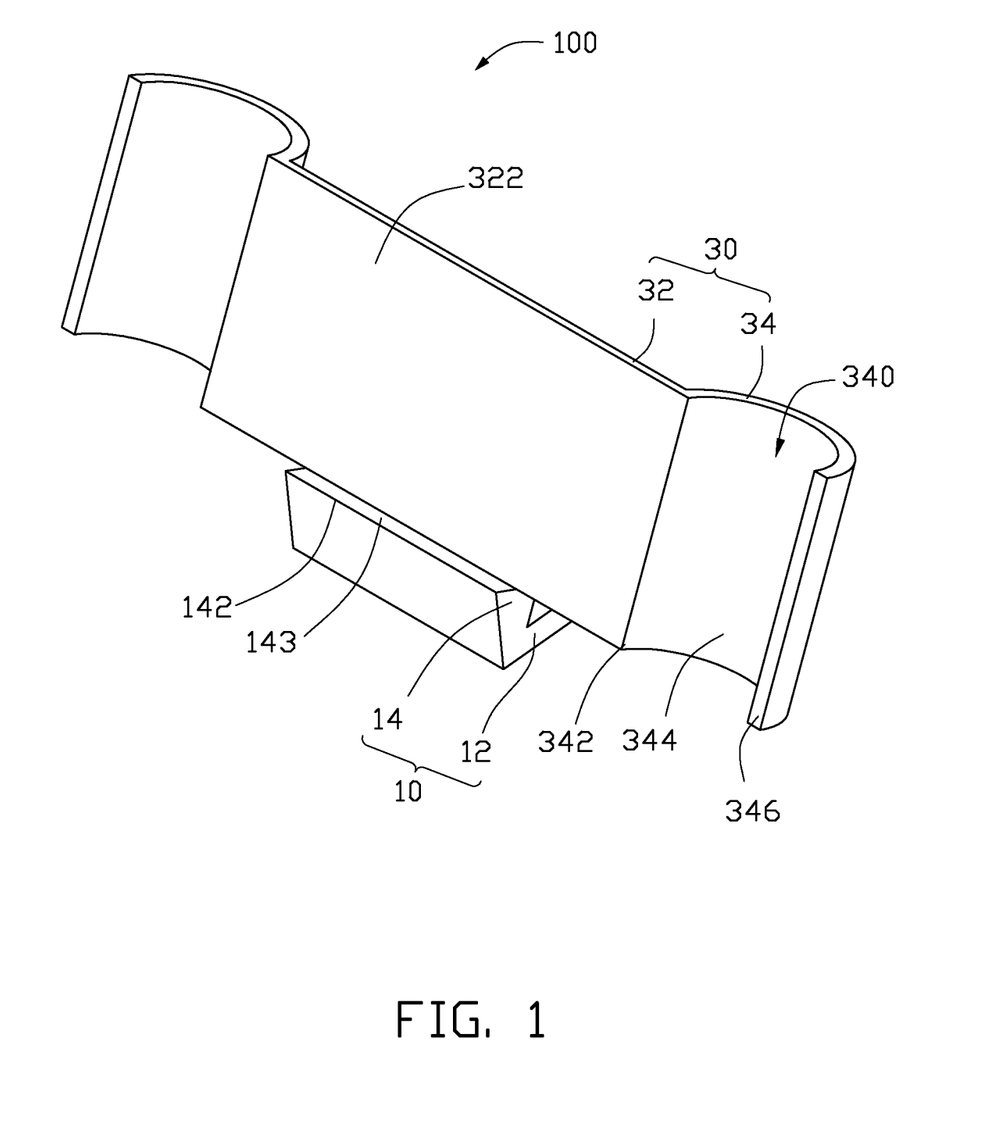
FIG. 1 is an isometric view of a first exemplary embodiment of a holder.

FIG. 1 is an isometric view of a first exemplary embodiment of a holder 100. The holder 100 supports a portable electronic device 200 (shown in FIG. 4), such as a mobile phone, a tablet computer, a personal digital assistant (PDA), and an electronic book.

Figure 2:
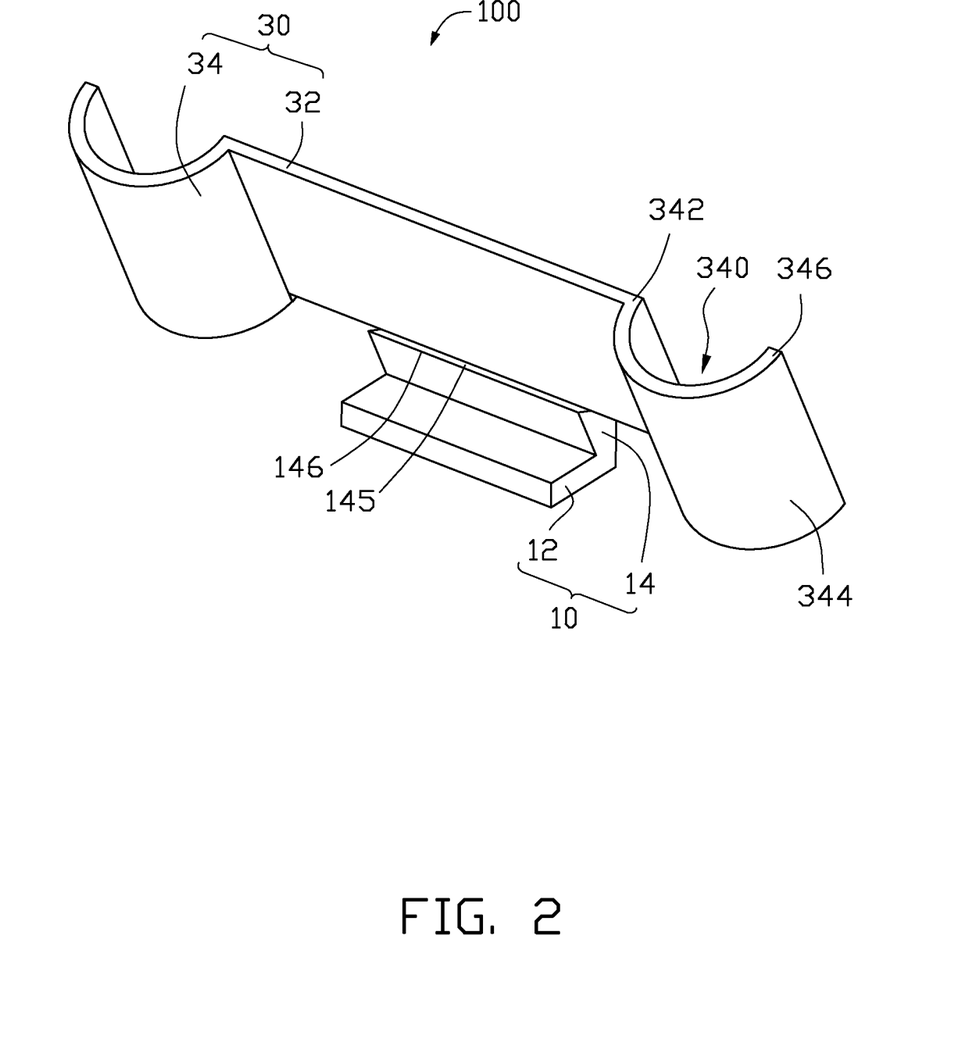
FIG. 2 is another isometric view of the holder shown in FIG. 1.

FIG. 2 is another isometric view of the holder 100 shown in FIG. 1. The holder 100 includes a pedestal 10 and a supporting board 30 mounted on the pedestal 10 with a predetermined angle. The pedestal 10 and the supporting board 30 are made by insert molding technology.

Figure 3:
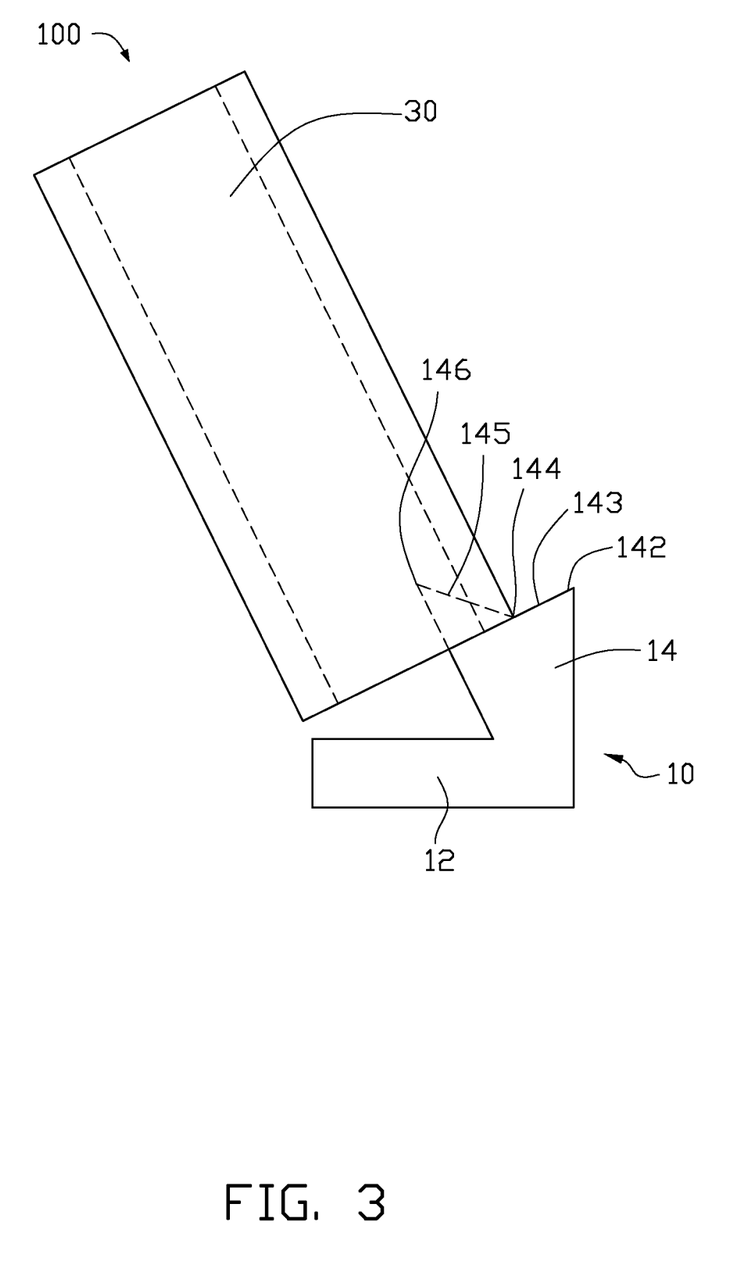
FIG. 3 is a side elevated view of the holder shown in FIG. 2.

FIG. 3 is a side elevated view of the holder 100 shown in FIG. 2. The pedestal 10 is substantially in the shape of L and includes a flat portion 12 and a connecting portion 14. The flat portion 12 is placed on a plane, such as a desk. The connecting portion 14 is approximately an inverted block and a bottom end of the connecting portion 14 is connected to an end of the flat portion 12 and extends upward to form the connecting portion 14. A top surface of the connecting portion 14 may have a V-shaped cross-section and includes a leading end 142, a valley 144, and a trailing end 146 along this direction. The valley 144 is formed on a middle portion of the top surface of the connecting portion 14. The valley 144 extends to the leading end 142 and the trailing end 146 respectively to form a first bevel 143 and a second bevel 145 respectively with a predetermined angle therebetween. In the present embodiment, the first bevel 143 has an obtuse angle relative to horizontal surface.

The supporting board 30 includes a resisting portion 32 and two resonator portions 34. The resisting portion 32 is a plane board with a lower end connected to the valley 144 of the pedestal 10 and has a predetermined angle with the first bevel 143. The resisting portion 32 has a resisting surface 322 facing the first bevel 143, and the resisting surface 322 has an obtuse angle relative to horizontal surface. Thus, the resisting surface 322 and the first bevel 143 form a supporting surface. The length of the resisting portion 32 is greater than the length of the pedestal 10, and two opposite ends of the resisting portion 32 extend out of the pedestal 10.

The two resonator portions 34 symmetrically protrude from the opposite ends of the resisting portion 32. Each resonator portion 34 includes a concavity 340 and a connecting end 342, an extending wall 344, a free end 346. The connecting end 342, the extending wall 344, and the free end 346 cooperatively form the concavity 340. The connecting end 342 is connected to an edge of the resisting portion 32. The extending wall 344 is in the shape of arcuate wall and extends from the connecting end 342 towards a side contrary to the resisting surface 322 a predetermined distance and then extends towards the resisting surface 322 to form an arcuate wall (see FIG. 5). The free end 346 is connected to an end of the extending wall 344 that is far away from the connecting end 342. An extension line of the resisting portion 32 intersects at an end portion of the extending wall 344 near the free end 346. The space sandwiched between the connecting end 342 and the free end 346 forms an opening corresponding to the extending wall 344.

Figure 4:
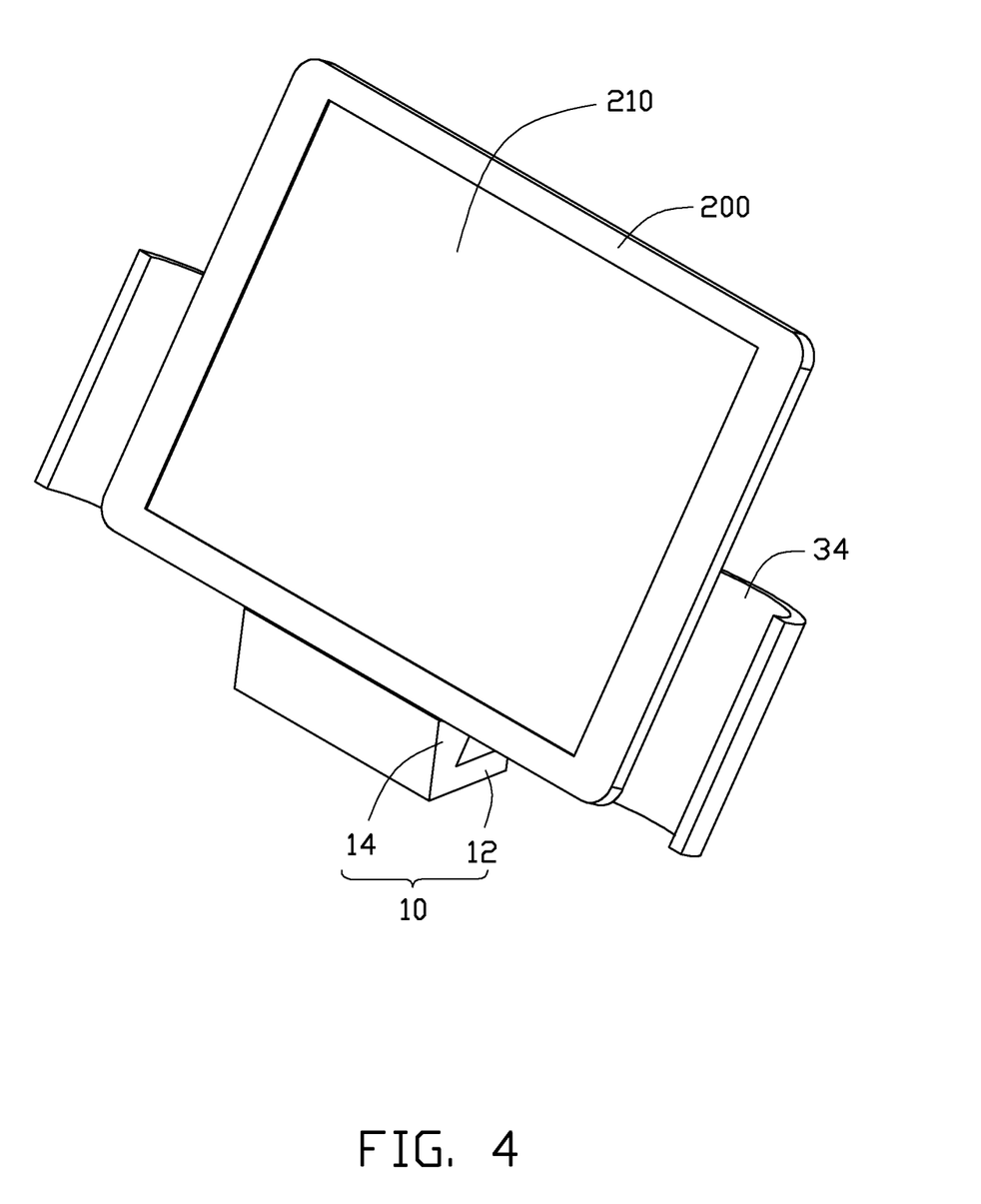
FIG. 4 is an isometric view of the holder shown in FIG. 1 holding a portable electronic device.

FIG. 4 is an isometric view of the holder 100 shown in FIG. 1 holding the portable electronic device 200. An edge of the portable electronic device 200 is supported by the first bevel 143 of the pedestal 10 and a back of the portable electronic device 200 is supported by the resisting surface 322 of the supporting board 30. The portable electronic device 200 includes a display 210 on front surface thereof. When the portable electronic device 200 is supported by the first bevel 143 and the resisting surface 322, because the first bevel 143 has obtuse angle relative to horizontal surface, the resisting surface 322 faces and has a square angle with the first bevel 143, thus the portable electronic device 200 is held on the first bevel 143 and the resisting surface 322 firmly. Because the portable electronic device 200 resists to the resisting surface 322, the portable electronic device 200 has an obtuse angle relative to horizontal surface, the display 210 leans upwards in this case, which is conveniently and comfortably for user watching.

Figure 5:
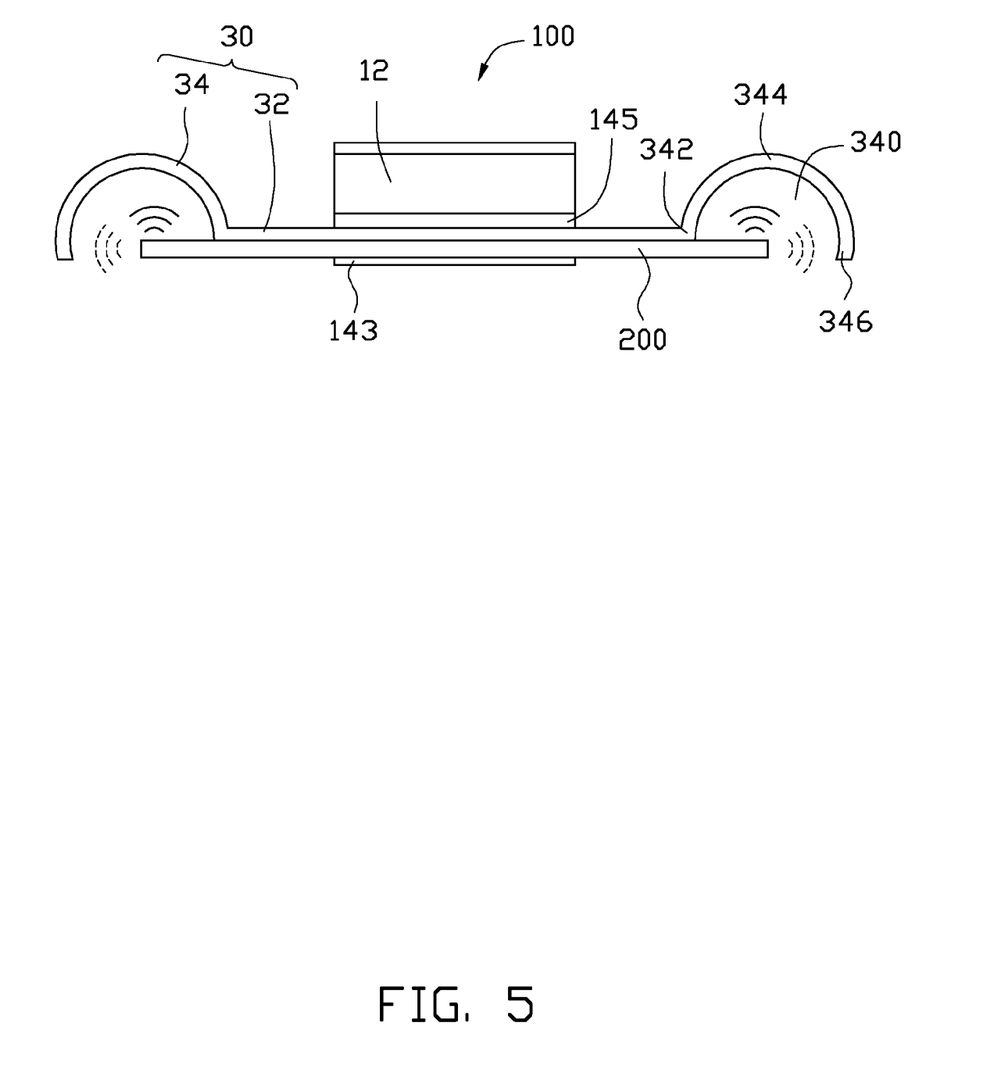
FIG. 5 is a top view of the holder holding the portable electronic device shown in FIG. 4.

FIG. 5 is a top view of the holder 100 holding the portable electronic device 200 shown in FIG. 4. The portable electronic device 200 includes two speakers (not shown) on opposite ends thereof. Sound generated by the speakers is transmitted from two opposite ends of a back surface of the portable electronic device 200 or from two side opposite ends of the portable electronic device 200. Each concavity 340 partially surrounds a speaker of the portable electronic device 200. When sound generated by the speakers is transmitted from two opposite ends of the back surface of the portable electronic device 200, the sound is aligned with the middle portion of the extending wall 344. Thus the sound resonates in the concavity 340 and is transmitted out of the concavity 340 along the guide of the extending wall 344, which reaches the users.

When sound generated by the speakers is transmitted from two side opposite ends of the portable electronic device 200, the sound is aligned with a portion of the extending wall 344 that is near the free end 346. As such, the sound resonates in the concavity 340 and is transmitted out of the concavity 340 along the guide of the extending wall 344. As a result, the resonator portion 34 forms a sound cavity and guiding function for the sound generated by the portable electronic device 200, which improves the sound performance and better transmission to the users.

Figure 6:
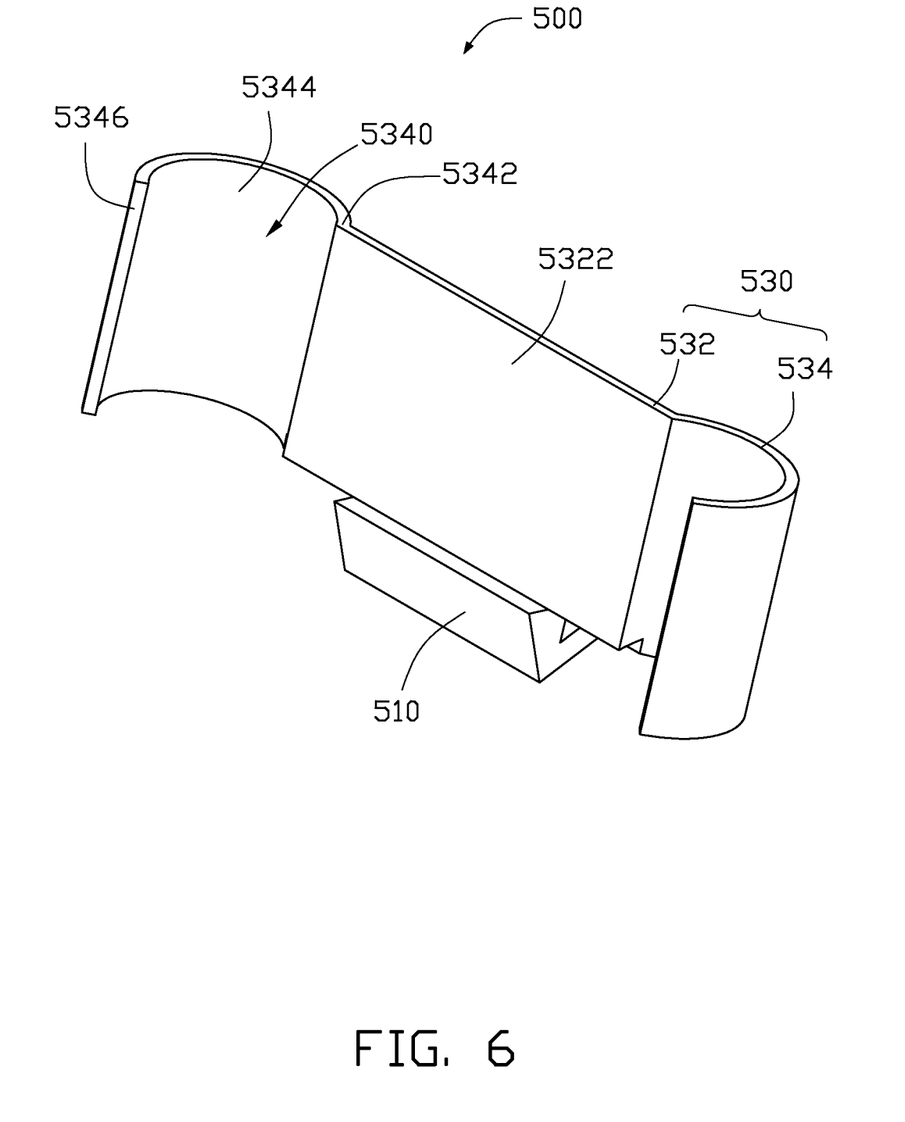
FIG. 6 is an isometric view of a second exemplary embodiment of a holder.

FIG. 6 is an isometric view of a second exemplary embodiment of a holder 500. In this embodiment, the holder 500 includes a pedestal 510 and a supporting board 530. The supporting board 530 includes a resisting portion 532 and two resonator portions 534. The resisting portion 532 includes a resisting surface 5322. The pedestal 510 in the second embodiment is the same as the pedestal 10 of the first embodiment. The structure of the resisting portion 532 mounted on the pedestal 510 in the second embodiment is the same as the structure of resisting portion 32 mounted on the pedestal 10 of the first embodiment. In the second embodiment, each resonator portion 534 includes a concavity 5340 and a connecting end 5342, an extending wall 5344, a free end 5346. The connecting end 5342, the extending wall 5344, and the free end 5346 cooperatively form the concavity 5340. The connecting end 5342 is connected to an edge of the resisting portion 532. The extending wall 5344 is in the shape of arcuate wall and extends from the connecting end 5342 towards a side contrary to the resisting surface 5322 a predetermined distance and then extends towards the resisting surface 322 to form an arcuate wall (see FIG. 8). An extension line of the resisting portion 532 intersects at a middle portion of the extending wall 5344.

Figure 7:
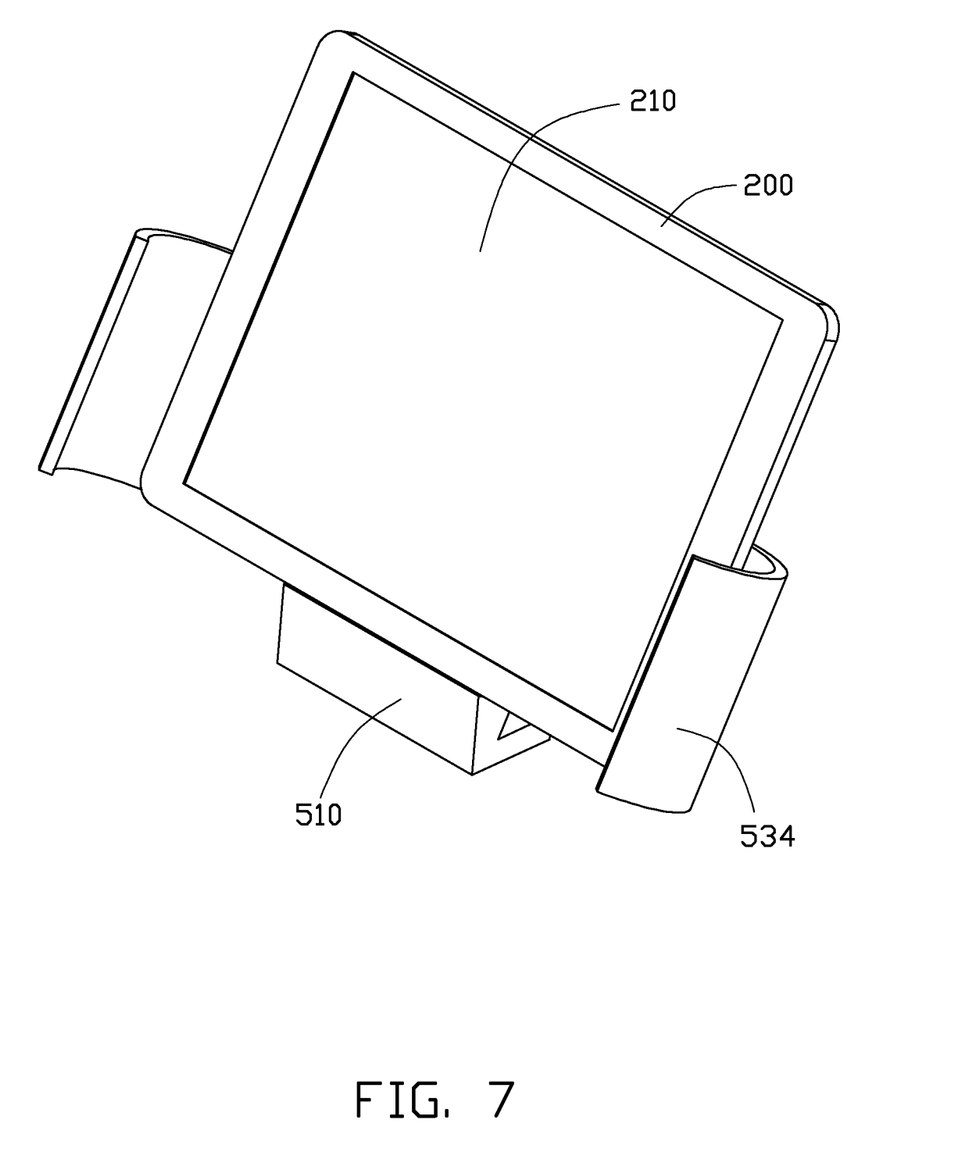
FIG. 7 is an isometric view of the holder shown in FIG. 6 holding a portable electronic device.
Figure 8:
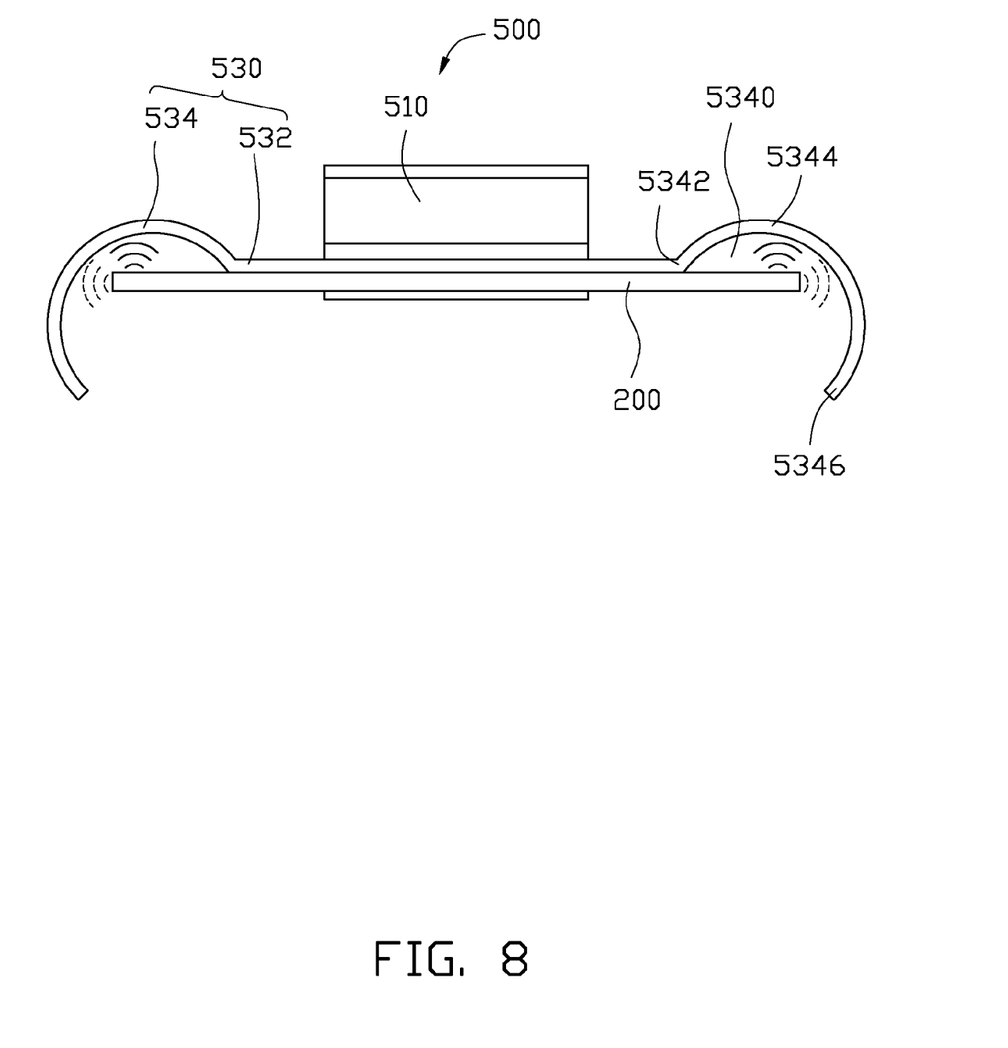
FIG. 8 is a top view of the holder holding the portable electronic device shown in FIG. 7.

FIG. 7 is an isometric view of the holder 500 shown in FIG. 6 holding the portable electronic device 200. FIG. 8 is a top view of the holder 500 holding the portable electronic device 200 shown in FIG. 7. The portable electronic device 200 is held by the pedestal 510 and the supporting board 530. Each concavity 5340 partially surrounds a speaker of the portable electronic device 200. When sound generated by the speakers is transmitted from two opposite ends of the back surface of the portable electronic device 200, the sound is aligned with a side portion of the extending wall 5344 that is near the connecting end 5342. When sound is transmitted from two side opposite ends of the portable electronic device 200, the sound is aligned with the middle portion of the extending wall 5344. As such, the sound resonates in the concavity 5340 and is transmitted out of the concavity 5340 along the guide of the extending wall 5344.

The holder 100 supports the portable electronic device 200 with a predetermined angle relative to horizontal surface according to the pedestal 10 and the supporting board 30, which is conveniently and comfortably for user watching. The supporting board 30 includes two resonator portions 34 on two opposite ends thereof, which improves the sound performance for the speakers of the portable electronic device 200. Thus, the holder 100 is multi-functional and convenient for use.

Even though numerous characteristics and advantages of the embodiments have been set forth in the foregoing description, together with details of the structure and function of the embodiments, the present disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A holder for supporting a portable electronic device, the holder comprising:
    a pedestal comprising a flat portion and a connecting portion, a bottom of the connecting portion connected to an end of the pedestal, a top surface of the connecting portion being a V-shaped cross-section and comprising a leading end, a valley, and a trailing end, the valley formed from a middle of the top surface and extended to the leading end and the trailing end to form a first bevel and a second bevel with predetermined angles; and
    a supporting board comprising a resisting portion and at least one resonator portion, wherein the resisting portion is mounted on and has a predetermined angle with a top surface of the pedestal, the resonator portion is connected to an edge of the resisting portion and extends from the edge towards a side contrary to the resisting portion a predetermined distance and then extends towards the resisting portion, the resisting portion and the top surface of the pedestal cooperatively support the portable electronic device, the resonator portion is configured to resonate and guide sounds generated by the portable electronic device.

2. The holder of claim 1, wherein the at least one resonator portion comprises two resonator portions connected to two opposite ends of the resisting portion, the two resonator portions is configured for partially surrounding two opposite ends of the portable electronic device, each resonator portion is configured for resonating and guiding the sound generated by the portable electronic device corresponding to the resonator portion.

3. The holder of claim 1, wherein the pedestal and the supporting board are made by insert molding technology, the connecting portion and the flat portion form a substantially L-shaped, the flat portion supports the connecting portion.

4. The holder of claim 3, wherein the resonator portion is in the shape of arcuate wall, the resisting portion is a plane board, the resisting portion is mounted on the valley and extends out of the opposite ends of the pedestal.

5. The holder of claim 4, wherein the resisting portion includes a resisting surface facing the first bevel, the resisting surface has a predetermined angle relative to horizontal surface and supports the portable electronic device together with the first bevel.

6. The holder of claim 5, wherein the resonator comprises a concavity and a connecting end, an extending wall, a free end, the connecting end, the extending wall, and the free end cooperatively form the concavity, the connecting end is connected to an edge of the resisting portion, two opposite ends of the extending wall are connected to the connecting end and the free end, the free end is connected to an end of the extending wall that is away from the resisting portion.

7. The holder of claim 6, wherein an opening is formed between the connecting end and the free end and is corresponded to the extending wall.

8. The holder of claim 6, wherein an extension line of the resisting portion intersects at an end portion of the extending wall near the free end.

9. The holder of claim 6, wherein an extension line of the resisting portion intersects at an middle portion of the extending wall.

10. A holder for supporting a portable electronic device, the holder comprising:
   a pedestal; and
   a supporting board, comprising a resisting portion and at least one resonator portion, wherein the resisting portion is mounted on and has a predetermined angle with a top surface of the pedestal, the resonator portion is connected to an edge of the resisting portion and extends from the edge towards a side contrary to the resisting portion a predetermined distance and then extends towards the resisting portion, the resisting portion and the top surface of the pedestal cooperatively support the portable electronic device, the resonator portion comprises a concavity, the concavity is configured for partially surrounding an end of the portable electronic device and resonating and guiding sounds generated by the portable electronic device;
   the pedestal and the supporting board are made by insert molding technology, the pedestal comprises a flat portion and a connecting portion, the connecting portion and the flat portion form a substantially L-shaped, the flat portion supports the connecting portion;
   a bottom of the connecting portion is connected to an end of the pedestal, the top surface of the connecting portion is in a V-shaped cross-section and includes a leading end, a valley, and a trailing end, the valley is formed from a middle of the top surface of the connecting portion and is extended to the leading end and the trailing end to form a first bevel and a second bevel with predetermined angles.

11. The holder of claim 10, wherein the at least one resonator portion comprises two resonator portions connected to two opposite ends of the resisting portion, the two resonator portions is configured for partially surrounding two opposite ends of the portable electronic device, each resonator portion is configured for resonating and guiding the sound generated by the portable electronic device corresponding to the resonator portion.

12. The holder of claim 10, wherein the resonator portion is in the shape of arcuate wall, the resisting portion is a plane board, the resisting portion is connected on the valley and extends out of two opposite ends of the pedestal.

13. The holder of claim 12, wherein the resisting portion includes a resisting surface facing the first bevel, the resisting surface has a predetermined angle relative to horizontal surface and supports the portable electronic device together with the first bevel.

14. The holder of claim 13, wherein the resonator comprises a connecting end, an extending wall, a free end, the connecting end, the extending wall, and the free end cooperatively form the concavity, the connecting end is connected to an edge of the resisting portion, opposite ends of the extending wall are connected to the connecting end and the free end, the free end is connected to an end of the extending wall that is away from the resisting portion.

15. The holder of claim 14, wherein an opening is formed between the connecting end and the free end and is corresponded to the extending wall.

16. The holder of claim 14, wherein an extension line of the resisting portion intersects at an end portion of the extending wall near the free end.

17. The holder of claim 14, wherein an extension line of the resisting portion intersects at a middle portion of the extending wall.

* * * * *